(12) United States Patent
Sabet et al.

(10) Patent No.: US 8,750,707 B2
(45) Date of Patent: Jun. 10, 2014

(54) SYSTEM AND METHOD FOR ESTABLISHING SECURE COMMUNICATIONS BETWEEN TRANSCEIVERS IN UNDERSEA OPTICAL COMMUNICATION SYSTEMS

(75) Inventors: Sameh A. Sabet, Freehold, NJ (US); Jonathan M. Liss, Marlboro, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 333 days.

(21) Appl. No.: 13/086,364

(22) Filed: Apr. 13, 2011

(65) Prior Publication Data

US 2012/0263476 A1  Oct. 18, 2012

(51) Int. Cl.
- *H04B 10/00* (2013.01)
- *H04L 9/28* (2006.01)
- *H04L 9/00* (2006.01)
- *H04K 1/00* (2006.01)

(52) U.S. Cl.
USPC ............... 398/104; 398/66; 398/58; 398/197; 398/178; 380/28; 380/263

(58) Field of Classification Search
USPC .......................................... 398/104; 380/263
See application file for complete search history.

(56) References Cited

U.S. PATENT DOCUMENTS

| | | | |
|---|---|---|---|
| 5,038,406 A | | 8/1991 | Titterton et al. |
| 7,949,254 B1 * | | 5/2011 | Stevens ........................... 398/40 |
| 2003/0011836 A1 * | | 1/2003 | Das et al. ....................... 359/110 |
| 2003/0219016 A1 * | | 11/2003 | Gyselings et al. ............. 370/390 |
| 2005/0095006 A1 * | | 5/2005 | Evangelides et al. ......... 398/158 |
| 2006/0107064 A1 * | | 5/2006 | Fiske ............................. 713/184 |
| 2006/0147178 A1 | | 7/2006 | Ekkizogloy et al. |
| 2010/0008666 A1 | | 1/2010 | Kovsh et al. |
| 2010/0040375 A1 | | 2/2010 | Sexton et al. |
| 2011/0058806 A1 | | 3/2011 | Sabet et al. |
| 2011/0200322 A1 | | 8/2011 | Kovsh et al. |

OTHER PUBLICATIONS

International Search Report and Written Opinion mailed Jul. 23, 2012 in corresponding PCT patent application No. PCT/US12/33546.

* cited by examiner

*Primary Examiner* — Oommen Jacob

(57) ABSTRACT

In general, a system and method provides secure communications between optical transceivers in an optical communication system. Two or more optical transceivers may be provisioned with one or more passcodes assigned to the transceivers, which may be used to indicate that received data traffic is intended for the transceivers. The transceivers may be configured to format data traffic with a secure version of the passcode in the overhead of the outbound signal and may be configured to determine if an inbound signal includes a secure version of the passcode provisioned in that transceiver. A transceiver may prevent data traffic from being read when the transceiver is not provisioned to receive data traffic with the embedded secure passcode and may insert an alternative maintenance signal (AMS) into an outbound signal in an opposite direction, at least temporarily, until the inbound signal includes the appropriate passcode.

16 Claims, 4 Drawing Sheets

SYSTEM AND METHOD FOR ESTABLISHING SECURE COMMUNICATIONS BETWEEN TRANSCEIVERS IN UNDERSEA OPTICAL COMMUNICATION SYSTEMS

TECHNICAL FIELD

The present disclosure relates to optical communication systems and in particular, to a system and method for establishing secure communications between trans-oceanic transceivers in an undersea optical communication system.

BACKGROUND

Signals may be used to transmit data over distances from a transmitter to a receiver. In optical communication systems, for example, data may be modulated on one or more optical wavelengths to produce modulated optical signals that may be transmitted over optical waveguides or paths such as optical fibers. Optical communications systems have used techniques, such as wavelength division multiplexing (WDM), to increase the transmission capacity. In a WDM system, a plurality of optical channels may be established based on a plurality of corresponding optical carrier wavelengths with multiple signals modulated on the separate channel wavelengths and combined to form an aggregate multiplexed signal or WDM signal. Modern WDM systems have a high traffic capacity, for example, a capacity to carry 96 or more channels at 10 gigabits per second (hereinafter Gb/s) or more.

A WDM system may include a relatively long trunk path (e.g., optical fiber) that may be terminated at a transmitting and/or receiving trunk terminal. Some WDM systems, such as branched undersea networks, may further include one or more branching units situated along the trunk path. Each branching unit (BU) may be connected to a branch path (e.g., optical fiber) that terminates in a transmitting and/or receiving branch terminal. Each BU may include one or more optical add/drop multiplexers (OADM). Channels may be dropped from and/or added to the trunk path via the OADMs to direct optical signals on selected channels to and from the branch terminals.

Security concerns are often encountered in optical communication systems as a result of optical signals including data traffic being directed to a terminal that was not intended to receive the data traffic. In branched undersea networks, for example, the added flexibility provided by OADMs may result in potential security concerns. OADMs allow system operators new levels of flexibility in sharing the capacity on a single fiber pair among multiple point-to-point connections in a branched network. This capability may improve the cost effectiveness of bandwidth delivery, especially to landing points with modest capacity requirements. Using OADMs in an undersea environment, however, also presents unique challenges and design constraints. In particular, the interdependence between trunk and branch traffic in such systems presents concerns in the event of a fault condition. A fault on a branch path, for example, may impair traffic on a trunk path due to the lack of uniform channel loading, and vice versa.

Some OADM systems in an undersea environment may use a recover mechanism whereby traffic is redirected and used to maintain uniform channel loading during a fault. One example of such a system configured for fault tolerance is disclosed in greater detail in U.S. patent application Ser. No. 12/707,604 filed Feb. 17, 2010, which is commonly owned and fully incorporated herein by reference. Although this solution provides fault tolerance and maintains substantially uniform channel loading, such systems present privacy and security concerns because customer traffic may be redirected to a new, unintended destination during a fault. Similar security and privacy concerns may also arise in point-to-point optical communication systems.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method, consistent with the present disclosure, provides secure communications between optical transceivers in an optical communication system, such as a branched undersea network or a point-to-point optical communication system. Two or more optical transceivers may be provisioned with one or more passcodes assigned to the transceivers, which may be used to indicate that received data traffic is intended for the transceivers. The transceivers may be configured to format data traffic with a secure version of the passcode in the overhead of the outbound optical signal and may be configured to determine if an inbound optical signal includes a secure version of the passcode provisioned in that transceiver. A transceiver may prevent data traffic from being read when the transceiver is not provisioned to receive data traffic with the embedded secure passcode and may insert an alternative maintenance signal (AMS) into an outbound optical signal in an opposite direction, at least temporarily, until the inbound optical signal includes the appropriate passcode.

The term "transceiver" as used herein refers to a device or apparatus that incorporates both transmitting and receiving functionality and includes a transponder. The term "provision" as used herein refers to the act of setting up a transceiver for use in the field by a customer and may include establishing parameters and settings of the transceiver for that particular customer. As used herein, "data traffic" refers to data, such as customer data, that is transmitted and received by transceivers in an optical communication system when in service. As used herein, "secure communications" refers to a communication between transceivers that are provisioned to transmit and receive the communication and does not require absolute security. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
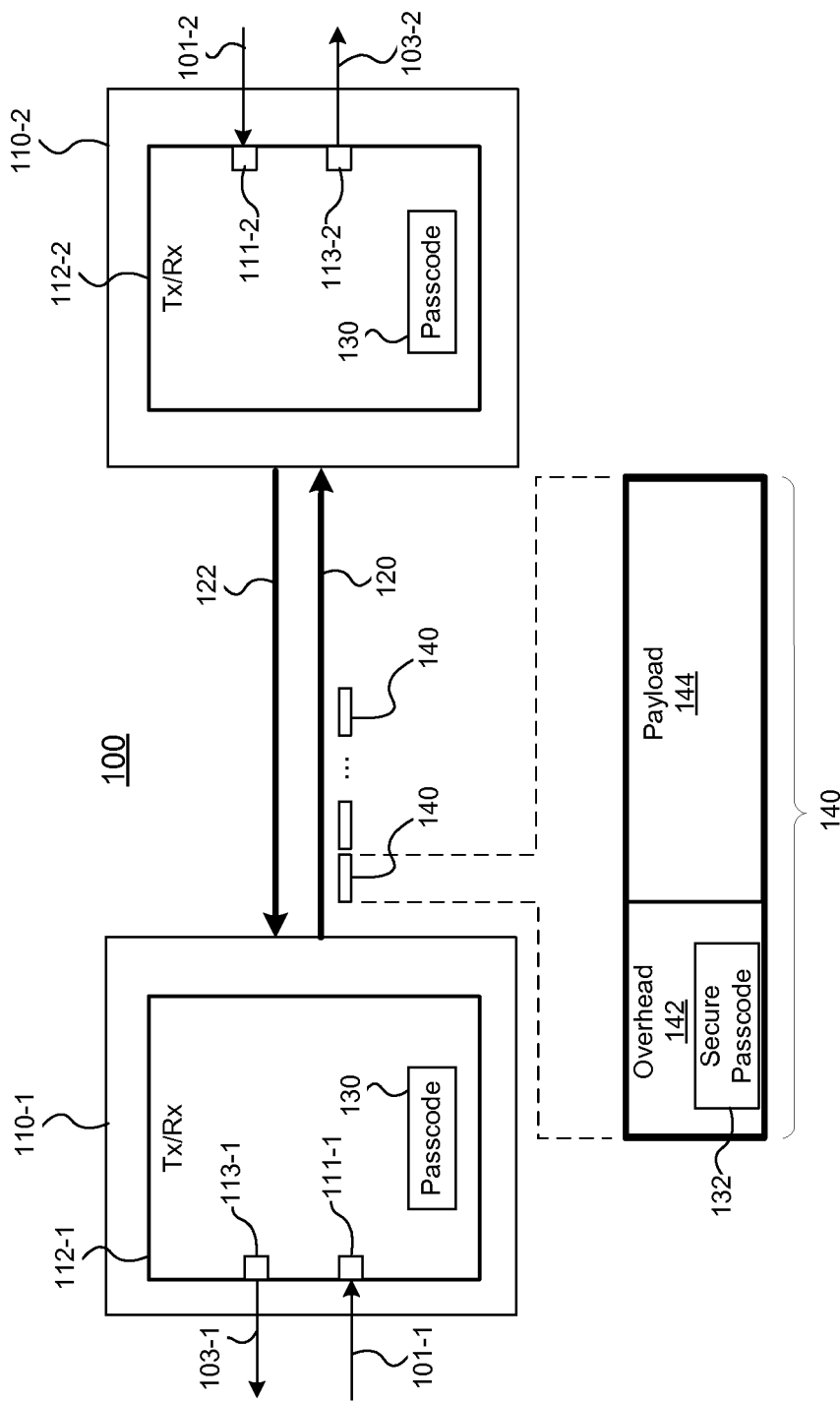
FIG. 1 is a schematic diagram of an optical communication system providing secure communications, consistent with the present disclosure.

Referring to FIG. 1, an embodiment of an optical communications system 100, consistent with the present disclosure, includes two or more optical transceivers 112-1, 112-2 coupled by one or more optical paths 120, 122. In the illustrated embodiment, each of the transceivers 112-1, 112-2 is capable of both transmitting and receiving optical signals and two optical paths 120, 122 provide bi-directional optical communications between the transceivers. The optical signals transmitted by the transceivers 112-1, 112-2 over respective optical paths 120, 122 may include data traffic 101-1, 101-2 and the optical signals received by the transceivers 112-1, 112-2 over respective optical paths 120, 122 may include data traffic 103-1, 103-2. Although the illustrated embodiment shows transceivers integrating transmitter and receiver functionality, separate transmitters and receivers may also be used to establish secure communications using the concepts described herein.

The optical communication system 100 may include a wavelength division multiplexed (WDM) system that transmits and receives a plurality of optical channels over the optical paths 120, 122. The optical channels may be established based on a plurality of corresponding optical carrier wavelengths such that each channel has a spectral width centered on the respective carrier wavelength (or frequency). As used herein, channel wavelengths refer to the wavelengths associated with the respective channels and may include a band of wavelengths centered on the carrier wavelength associate with a channel. In a WDM system multiple transceivers may be used to transmit and receive respective optical signals at different channel wavelengths. Multiplexers (not shown) may be used to combine the channel wavelengths to form an aggregate WDM optical signal and demultiplexers may be used to separate the channel wavelengths from an aggregate WDM optical signal.

The transceivers 112-1, 112-2 (and multiplexers) may be located within terminals or cable stations 110-1, 110-2. In particular, the transceivers 112-1, 112-2 may be located in trunk and/or branch terminals of a branched network, as described below. The optical paths 120, 122 may include optical waveguides or fibers, for example, in a fiber optic cable, and may also include other components used in optical communications, such as amplifiers and branching units. In an undersea optical communication system, the terminals or cable stations 110-1, 110-2 may be located on land and the optical paths 120, 122 may be located under water.

The transceivers are shown in highly simplified form for ease of explanation. Each of the transceivers 112-1, 112-2 may include electrical and optical components configured for transmitting the optical signal(s) at the associated channel wavelength(s) with a desired amplitude and modulation. The transceiver components may include, without limitation, lasers, modulators, demodulators, multiplexers, demultiplexers, amplifiers, optical detectors, forward error correction (FEC) encoders, FEC decoders, and framers. The transceivers 112-1, 112-2 also include client ports 111-1, 111-2, 113-1, 113-2 for providing the data traffic 101-1, 101-2 transmitted in optical signals on paths 120, 122 and for accessing the data traffic 103-1, 103-2 received in optical signals on paths 120, 122.

Each of the transceivers 112-1, 112-2 is provisioned with at least one matching passcode 130 used to determine if the transceiver is receiving data traffic intended for that transceiver. The passcode 130 may be stored in the transceiver, for example, together with other parameters or data associated with the transceiver. The passcode 130 may include, for example, an alphanumeric code uniquely assigned to the transceivers 112-1, 112-2 and may be stored, for example, in data storage or memory. A transmitting transceiver 112-1 may provide a secure version of the passcode 130 (or secure passcode 132) in a data transmission such that a receiving transceiver 112-2 may determine if the data is intended for that receiving transceiver (e.g., by determining a match with the passcode stored in that receiving transceiver). The transceivers 112-1, 112-2 may thus continuously exchange the secure passcode 132 with the data in the optical signals and may continuously verify the accuracy of the secure passcode 132. Using the secure passcode 132 reduces the likelihood that the passcode 130 will be compromised as a result of an interception of the optical signals.

In the illustrated embodiment, the first or transmitting transceiver 112-1 formats the data traffic 101-1 as a series of frames 140 including overhead 142 and payload 144 and includes the secure passcode 132 in the overhead 142 of one or more of the frames 140. In general, the payload includes the data traffic and the overhead includes information used to provide various management functions such as monitoring transmission. Synchronous Optical Networking (SONET) or Synchronous Digital Hierarchy (SDH) protocols may be used, for example, to format the data traffic 101-1 using SONET or SDH framing. The first transceiver 112-1 may use SONET or SDH framers to include the secure passcode 132 in the overhead 142 of the frame(s) 140 when formatting the data. After formatting the data, the transceiver 112-1 modulates one or more channel wavelengths with the formatted data to generate the optical signal(s) to be transmitted over the respective optical path 120.

In one embodiment, the secure passcode 132 may include the passcode 130 in the form of overhead bits that are scrambled as part of the transmitted frame(s). In other embodiments, the secure passcode 132 may include a hash code generated by applying a hash function to the passcode 130, for example, as follows: $f(x)=f(passcode)$. The hash function may include various generic hash functions including, without limitation, a polynomial function. To provide additional security, a time dependent hash function may be used to obtain the hash code as follows: $f(x)=f1(passcode)+f2(current\ time)$. In this embodiment, the transceivers 112-1, 112-2 may use accurate time-stamping via a Network Time Protocol (NTP) server. Including the time-based component in the hash function further prevents easy duplication of the passcode values, for example, if comprised as a result of "eavesdropping." In other embodiments, the secure passcode 132 may be generated using other techniques such as encryption and digital certificates.

As illustrated, the second or receiving transceiver 112-2 receives the inbound optical signal including the formatted data frames 140, demodulates the optical signal, and detects the data in the optical signal. The second transceiver 112-2 may then extract the secure passcode 132 from the overhead 142 in the frames 140 and determine if the secure passcode 132 corresponds to the passcode 130 for which the second transceiver 112-2 was provisioned. If SONET/SDH framing is used, a SONET/SDH framer may be used to process the frames 140 to extract the overhead 142 including the secure passcode 132. The second transceiver 112-2 may use transmission monitoring components and techniques to determine if the passcodes match and to initiate the appropriate action in response, as described below. The transmission monitoring components may include, for example, hardware, software, firmware and any combination thereof, which is capable of monitoring the content of the overhead in the transmission frames and capable of controlling the output of data traffic to client ports in the transceiver.

If the secure passcode 132 is a hash code, the second transceiver 112-2 may apply the hash function to the passcode 130 located on the second transceiver 112-2 to produce a hash code and then compare the resulting hash code to the hash code received in the frame 140. If the time-based hash function is used, the receiving transceiver may determine if the hash codes substantially correspond or match (i.e., within some margin of error) to account for a time drift between the two transceivers. For example, the receiving transceiver may consider $f(x)$, $f(x+1)$, or $f(x-1)$ as valid or corresponding hash codes.

If the second transceiver 112-2 determines that the secure passcode 132 in the frame(s) 140 corresponds to the passcode 130 for which the second transceiver 112-2 is provisioned (e.g., the hash codes match), the second transceiver 112-2 allows the data traffic to pass through to the client port 113-2 such that the data traffic 103-2 may be read from the transceiver 112-2. If the second transceiver 112-2 determines that the secure passcode in the frame(s) 140 does not correspond to the passcode 130 for which the second transceiver 112-2 is provisioned (e.g., the hash codes do not match), the second transceiver 112-2 may prevent the data traffic 103-2 from being read, for example, by shutting down the client port 113-2. The transceivers may thus prevent the traffic from being read by an unintended receiver either accidentally or maliciously.

The second transceiver 112-2 may also stop the transmission of data traffic 101-2 on outbound optical signal(s) over the optical path 122 to the first transceiver 112-1 in response to a passcode mismatch. In one embodiment, the second transceiver 112-2 may provisionally cause an alternative maintenance signal (AMS) signal (i.e., instead of the data traffic 101-2) to be inserted in the opposite direction on the optical path 122. When signals are used to provide loading in a bi-directional trunk restoration in a branched network, for example, those signals will contain only the AMS and not the data traffic. A transceiver may also cause an AMS to be inserted instead of data traffic when other faults or errors are detected, such as a loss-of-frame (LOF). The AMS may include a predetermined bit pattern (e.g., 010101 . . . ) or a random or pseudo-random bit pattern.

During operation, both transceivers 112-1, 112-2 may continuously format frames with the secure passcode for transmission and continuously determine whether or not the secure passcodes in the received data frames correspond to the passcode for which the transceiver was provisioned. As long as the transceivers 112-1, 112-2 have matching passcodes 130, the received data traffic will be allowed to pass through to the respective client ports. If an optical signal from a transceiver without a matching passcode is directed to one of the optical paths 120, 122 and a mismatch occurs in at least one of the transceivers, the transceiver shuts down the client port(s) and inserts the AMS instead of the data traffic in the opposite direction. When a transceiver inserts the AMS instead of the data traffic, the AMS may be formatted as frames with the passcode in the overhead. Thus, the passcode may be transmitted continuously (i.e., even during a mismatch) such that on reconnection of the correct paths, the data traffic transmission may resume normally.

Figure 2A:
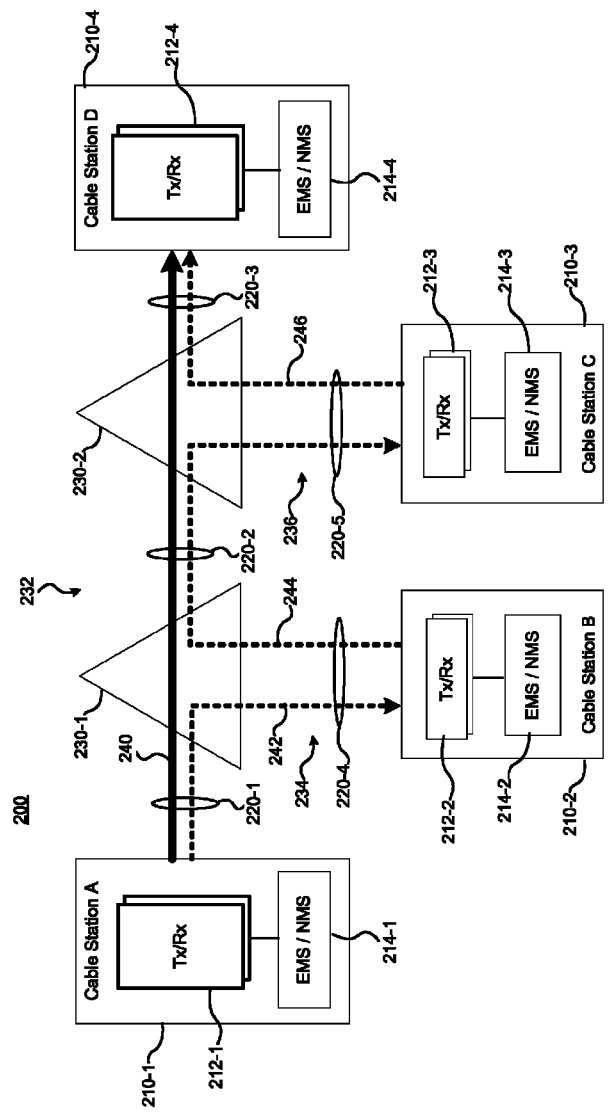
FIG. 2A is a schematic diagram of an embodiment of a branched undersea network configured for secure communications, consistent with the present disclosure, with branching units directing optical signals to intended transceivers.
Figure 2B:
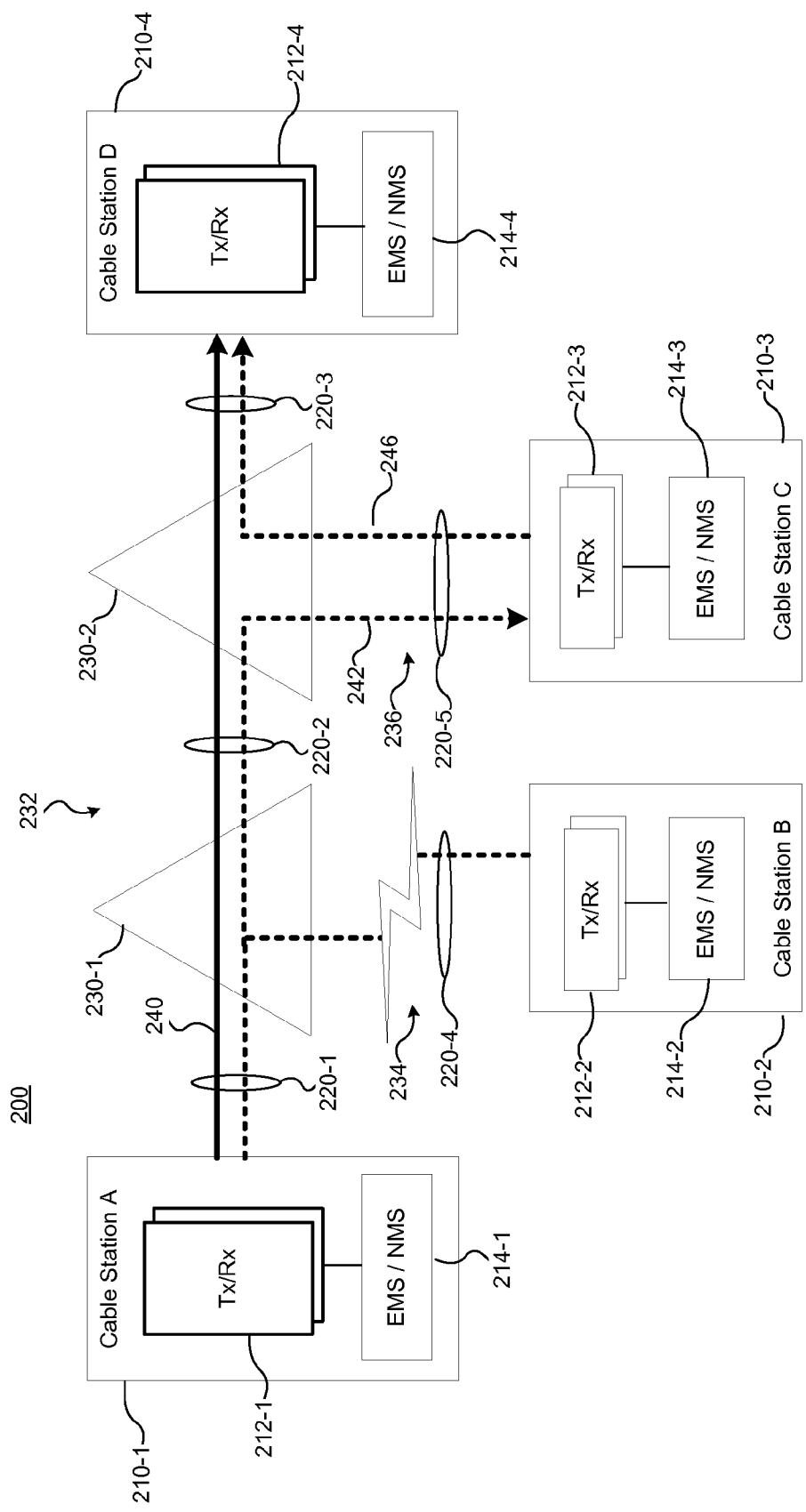
FIG. 2B is a schematic diagram of the branched undersea network shown in FIG. 2A with one branching unit redirecting at least one optical signal to a different transceiver.

Referring to FIGS. 2A and 2B, one example of a branched optical network 200 implementing the secure communications system and method, consistent with the present disclosure, is described in greater detail. The branched optical network 200 includes terminals or cable stations 210-1 to 210-4 coupled to a plurality of cable segments 220-1 to 220-5 and branching units 230-1, 230-2. In one embodiment, the branched optical network 200 is a branched undersea network with one or more of the cable stations 210-1 to 210-4 located on land and the cable segments 220-1 to 220-5 and branching units 230-1, 230-2 located undersea (e.g. on the ocean floor). The system 100 may be configured as a long-haul system, for example, spanning a body of water (e.g. an ocean) between beach landings with a length of more than about 600 km. Although one configuration is illustrated, a branched optical network may include any number of cable stations, branching units, and cable segments.

The cable segments 220-1 to 220-3 form a trunk path 232 and the cable segments 220-4, 220-5 form branch paths 234, 236, respectively. The cable segments 220-1 to 220-5 include one or more optical fibers for carrying optical signals. One or more repeaters (not shown) may also be coupled to the cable segments within the trunk path 232 and/or branch paths 234, 236 to amplify the optical signals. Although the illustrated embodiment shows communication in one direction between certain cable stations, each of the cable segments may include optical fiber pairs providing optical paths for bi-directional communication between any of the cable stations 210-1 to 210-4. The components in the trunk path 232 and branch paths 234, 236 may include various configurations for achieving their intended functionality.

The branched optical network 200 is configured to provide WDM communications over the trunk path 232 and branch paths 234, 236. Each of the cable stations 210-1 to 210-4 may thus include multiple transceivers 212-1 to 212-4 for transmitting optical signals on multiple channel wavelengths and multiplexers/demultiplexers (not shown) for combining and separating the channel wavelengths. The branching units 230-1, 230-2 receive the WDM signals on the trunk path 232 and direct optical signals to and from the branch paths 234, 236 and branch terminals 210-2, 210-3 by dropping and adding the allocated channel wavelengths. The branching units 220-1, 220-2 may include the components (e.g., couplers) to couple the trunk cable segments to the branch cable segments and may also provide OADM components (e.g., wavelength selective elements or filters) to add and drop channel wavelengths at the branch paths. The couplers and/or OADM components may also be provided in predetermined wavelength filter (PWF) units integrated with or separately coupled to the branching units. One or more of the cable stations 210-1 to 210-4 may also include an element or network management systems 214-1 to 214-4 to manage communications in the branched network 200 including the allocation of channels and the adding and dropping of channel wavelengths in the branching units 230-1, 230-2.

The OADM functionality may be implemented using optical devices for which the optical coupling and/or optical filtering characteristics may be changed or controlled in an installed branching configuration using local or remote control signals transmitted through the optical fibers in the undersea system cables. Examples of controllable optical devices that may be used to provide OADM functionality include, without limitation, optical switches, tunable optical filters, variable optical attenuators, wavelength selective switches, and reconfigurable optical add drop multiplexers (ROADMs). In one embodiment, the element or network management systems 214-1 to 214-4 may transmit control signals to control or reconfigure the branching units 230-1, 230-2, for example, in response to detecting a fault. One example of a system for fault sensing and recovery is disclosed in U.S. Patent Application Publication No. 2011/0058806, which is commonly owned and fully incorporated herein by reference.

In general, a WDM signal may originate at one or more of the cable stations 210-1 to 210-4 and may include a plurality of multiplexed optical signals modulated on a plurality of different channel wavelengths. One or more channels may be allocated as express channels 240 configured to travel uninterrupted through the trunk path 232 from an originating trunk terminal 210-1 through the branching units 230-1, 230-2 and to a receiving trunk terminal 210-4. One or more other channels may be allocated as local channels 242, 244, 246 that are added and dropped by the branching units 230-1, 230-2 to/from the branch terminals 210-2, 210-3. Thus, a WDM signal that originates at trunk terminal 210-1 may include information signals occupying multiple channels including express channel(s) 240 and local channel(s) 242. A signal that originates at branch terminal 210-2 may include one or more information signals occupying one or more local channels 244. Because the local channels are added and dropped at the branch terminals 210-2, 210-3, the local channels between different terminals may use the same channel wavelengths also referred to as reuse wavelengths. For example, the A-B local channel(s) 242 (between Station A 210-1 and Station B 210-2), the B-C local channel(s) 244, and the C-D local channel(s) 246 may all occupy the same channel wavelengths.

The branched optical network 200 may provide substantially uniform channel loading on the trunk and/or branch paths. In the branched optical network 200, certain unutilized channels may not include information signals and the unutilized channels may be loaded with loading signals to maintain uniform channel loading. A loading signal may include a non-information carrying signal such as broadband noise, e.g. ASE noise, ASE noise band or a dummy tone. Dummy tones generally refer to optical energy that is centered on a specific wavelength and that does not carry information or traffic. In some embodiments, however, the loading signals may also include information carrying channels on channel wavelengths that have been redirected in response to detecting a fault.

As shown in FIG. 2B, for example, a fault in the cable segment 220-4 may disrupt data traffic on the branch path 234, preventing the B-C local channel 244 from being added at the branching unit 230-1 to the trunk path 232. To prevent performance degradation from the loss of the B-C local channel 244 on the trunk path 232 between the branching units 230-1, 230-2, the branching unit 230-1 redirects the A-B local channel 242 to the trunk cable segment 220-2. One example of such a system that redirects channel wavelengths to provide fault tolerance is disclosed in greater detail in U.S. patent application Ser. No. 12/707,604 filed Feb. 17, 2010, which is commonly owned and fully incorporated herein by reference. Because A-B local channel 242 uses the same channel wavelengths as the B-C local channel 244, the A-B local channel is dropped and directed to branch terminal 210-3 (Cable Station C), where the A-B local channel was not intended to be received. The system and method of secure communications between transceivers described herein may thus prevent the data traffic on the A-B local channel 242 from being read at an unintended transceiver 212-3 in the branch terminal 210-3.

The transceivers 212-1 to 212-4 in the branched optical network 200 may include the secure communications functionality described above and may be provisioned with passcodes that match the other transceivers at the end of a point-to-point connection. In particular, the transceiver(s) 212-1 (in the trunk terminal 210-1) that transmit and receive data traffic over the A-B local channel 242 are provisioned with the same passcode as the transceiver(s) 212-2 (in the branch terminal 210-2) that transmit and receive data traffic over the A-B local channel 242. The transceiver(s) 212-2 (in the branch terminal 210-2) that transmit and receive data traffic over the B-C local channels 244 may be provisioned with the same passcode as the transceiver(s) 212-3 (in the branch terminal 210-3) that transmit and receive data traffic over the B-C local channels 244. The transceiver(s) 212-3 (in the branch terminal 210-3) that transmit and receive data traffic over the C-D local channel 246 are provisioned with the same passcode as the transceiver(s) 212-4 (in the trunk terminal 210-4) that transmit and receive data traffic over the C-D local channel 246. The transceiver(s) 212-1 (in the trunk terminal 210-1) that transmit and receive data traffic over the express channels 240 may be provisioned with the same passcode as the transceiver(s) 212-4 (in the trunk terminal 210-4) that transmit and receive data traffic over the express channels.

Figure 3:
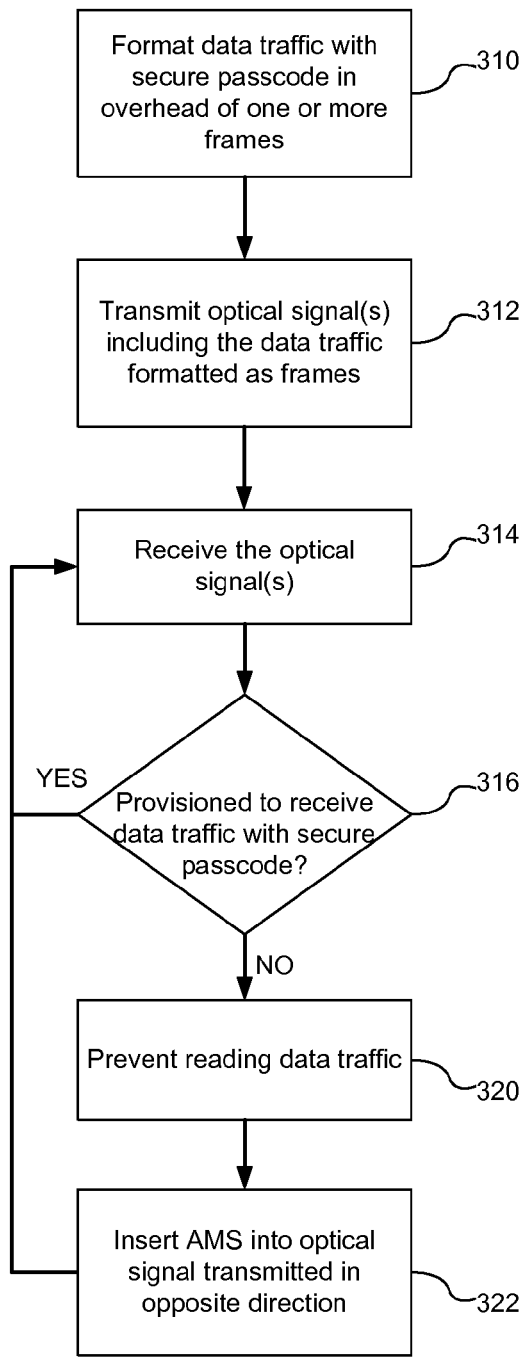
FIG. 3 is a flow chart illustrating a method of providing secure communications between transceivers in an optical communication system, consistent with the present disclosure.

FIG. 3 shows one example of a method of establishing secure communications between at least first and second optical transceivers (e.g., optical transceivers in branch terminals 210-2, 210-3 in FIGS. 2A and 2B). One or more transmitting optical transceivers format 310 data traffic with a secure passcode in the overhead of one or more frames, for example, as described above. The transmitting optical transceiver(s) transmit(s) 312 the optical signals including the data traffic formatted as frames with the secure passcodes. In the embodiment illustrated in FIG. 2A, for example, a transceiver 212-1 in the trunk terminal 210-1 formats data traffic with a secure version of the passcode assigned to the transceiver 212-1 and transmits an optical signal including this data traffic over the A-B local channel 242 and a transceiver 212-2 in branch terminal 210-2 formats data traffic with a secure version of the passcode assigned to the transceiver 212-2 and transmits an optical signal with this data traffic over the B-C local channel 244.

One or more receiving optical transceivers receive 314 the respective optical signals and determine 316 if the receiving transceiver is provisioned to receive the data traffic including the secure passcode. If a receiving optical transceiver is provisioned to receive the data traffic, the receiving optical transceiver will allow the data traffic to be read and continues to receive 314 the optical signals. If a receiving optical transceiver is not provisioned to receive the data traffic, the receiving transceiver prevents 320 reading of that data, inserts 322 an AMS into the optical signal being transmitted in the opposite direction, and continues to receive 314 the optical signals. In other embodiments, the receiving optical transceiver may prevent the data traffic from being read without inserting the AMS into the outbound optical signal.

In the illustrated embodiment of FIG. 2A, for example, optical transceivers 212-2, 212-3 in the branch terminals 210-2, 210-3 are provisioned to transmit and receive data traffic on the B-C local channel. If the A-B local channel is redirected from the branch terminal 210-2 to the branch terminal 210-3, as shown in FIG. 2B, the optical transceiver provisioned for the B-C local channel in the branch terminal 210-3 will receive the A-B local channel but will prevent the data traffic on that A-B local channel from being read and will insert an AMS in the optical signal (not shown) being transmitted in an opposite direction back to the transceiver transmitting the A-B channel in the trunk terminal 210-1. The optical transceiver transmitting the A-B channel in the trunk terminal 210-1 may then receive the optical signal with the AMS and determine that it is not provisioned to receive data traffic from the transceiver provisioned for the B-C channel in the branch terminal 210-3. The optical transceiver provisioned for the A-B channel in the trunk terminal 210-1 may then similarly insert an AMS into the optical signal on the A-B channel transmitted to the branch terminal 210-3.

Both the optical transceivers (in the trunk terminal 210-1 and the branch terminal 210-3) may then continue to receive optical signals on the A-B local channel and monitor the frames in the optical signals to determine when the intended transmissions are restored. If the fault in the branch cable segment 220-4 is repaired, for example, the transmission on the B-C channel from the transceiver provisioned for the B-C channel in the branch terminal 210-2 may be restored and the transmission on the A-B channel may be directed back to the transceiver provisioned for the A-B channel in the branch terminal 210-2. When the transmission on the B-C channel resumes, the transceiver provisioned for the B-C channel in the branch terminal 210-3 may then determine that the passcodes match and that transceiver will once again allow the data traffic to be read and will resume a normal data traffic transmission in the opposite direction.

Accordingly, the secure communication system and method, consistent with the present disclosure, helps to ensure the privacy and security of customer data traffic when the data traffic is directed to an unintended transceiver, for example, in the event of a reconfiguration of a branched optical network during fault recovery. Although the secure communications system and method is described specifically in the context of redirecting optical signals in a branched optical network, the system and method may also be used to provide secure communications in other applications or situations involving a security or privacy concern. Where transceivers are replaced in a terminal or cable station, for example, the secure communications system and method may prevent unfriendly parties from transmitting and/or receiving data traffic to and/or from an optical transceiver that is configured and provisioned with a passcode as described herein.

Consistent with one embodiment, a method is provided for secure communications between optical transceivers in an undersea optical communication system. The method includes: formatting data traffic as a plurality of frames in a first optical transceiver, wherein overhead of at least one of the frames includes a secure passcode; transmitting at least a first optical signal including the data traffic formatted as the plurality of frames from the first optical transceiver; receiving the first optical signal at a second optical transceiver; and determining if the second optical transceiver is provisioned to receive data traffic including the secure passcode, and if the second optical transceiver is not provisioned to receive data traffic including the secure passcode, preventing the data traffic from being read from the second optical transceiver at least temporarily.

Consistent with another embodiment, method is provided for securely receiving data traffic in an undersea optical communication system. The method includes: receiving an inbound optical signal at an optical receiver, the inbound optical signal including data traffic formatted as a plurality of frames, wherein overhead of at least one of the frames includes a secure passcode; and determining if the optical receiver is provisioned to receive data traffic including the secure passcode, and if the optical transceiver is not provisioned to receive data traffic including the secure passcode, preventing the data traffic from being read from the optical receiver at least temporarily.

Consistent with a further embodiment, an optical communication system includes at least a first optical transceiver configured to format data traffic as a plurality of frames, to include a secure passcode in overhead of at least one of the frames, and to transmit at least a first optical signal including the data traffic formatted as the plurality of frames from the first optical transceiver. The optical communication system also includes at least a second optical transceiver configured to receive the first optical signal and to determine if the second transceiver is provisioned to receive data traffic including the secure passcode, and if the second transceiver is not provisioned to receive data traffic including the secure passcode, to prevent the data traffic from being read from the second optical transceiver at least temporarily. An optical path couples the first and second optical transceivers and is configured to carry optical signals transmitted between the optical transceivers.

Consistent with yet another embodiment, apparatus includes an optical receiver configured to receive an inbound optical signal, the inbound optical signal including data traffic formatted as a plurality of frames, wherein overhead of at least one of the frames includes a secure passcode. The optical receiver is also configured to determine if the optical receiver is provisioned to receive data traffic including the secure passcode, and if the optical receiver is not provisioned to receive data traffic including the secure passcode, to prevent the data traffic from being read from the optical receiver at least temporarily.

Consistent with yet another embodiment, a method is provided for establishing secure communications between optical transceivers in an undersea optical communication system. The method includes: provisioning at least first and second optical transceivers with matching passcodes, wherein each of the first and second optical transceivers is configured to format data traffic as a plurality of frames, to include a secure version of the passcode in overhead of at least one of the frames, and to transmit at least an optical signal including the data traffic formatted as the plurality of frames, and wherein each of the first and second optical transceivers is configured to receive optical signals and to determine if the respective transceiver is provisioned to receive data traffic including a secure passcode in data frames in the received optical signals, and if the respective transceiver is not provisioned to receive data traffic including the secure passcode, to prevent the data traffic from being read at least temporarily; and deploying the first and second optical transceivers in the undersea optical communications system.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for secure communications between optical transceivers in an optical communication system, the method comprising:

formatting data traffic as a plurality of frames in a first optical transceiver, wherein overhead of at least one of the frames includes a secure passcode;

transmitting at least a first optical signal including the data traffic formatted as the plurality of frames from the first optical transceiver;

receiving the first optical signal at a second optical transceiver provisioned to receive the data traffic including the secure passcode and allowing the second optical signal transceiver to read the data traffic;

after the second optical transceiver stops receiving the first optical signal, receiving the first optical signal at a third optical transceiver that is not provisioned to receive the data traffic including the secure passcode; and in response to determining that the third optical transceiver is not provisioned to receive the data traffic including the secure passcode, preventing the data traffic from being read from the third optical transceiver at least temporarily and provisionally inserting an alternative maintenance signal into a third optical signal transmitted by the third optical transceiver.

2. The method of claim 1 further comprising in response to receiving the alternative maintenance signal from the third optical transceiver, provisionally inserting a second alternative maintenance signal into the first optical signal instead of the data traffic.

3. The method of claim 1 wherein the optical communication system includes an undersea branched optical network, and wherein the first optical signal is transmitted onto an optical path in the undersea branched optical network.

4. The method of claim 3 wherein the first optical signal is redirected to the third optical transceiver by a branching unit in the branched optical network in response to detecting fault in at least a portion of the undersea branched optical network between the first optical transceiver and the second optical transceiver.

5. The method of claim 1 wherein the optical communication system includes a point-to-point undersea optical communication system, and wherein the first optical signal is transmitted onto an optical path in the point-to-point undersea optical communication system.

6. The method of claim 1 wherein the secure passcode includes a hash code obtained by applying a hash function to a passcode assigned to the first optical transceiver.

7. A method for securely receiving data traffic in an undersea optical communication system, the method comprising:
    receiving an inbound optical signal at an optical receiver, the inbound optical signal including inbound data traffic formatted as plurality of frames, wherein overhead of at least one of the frames includes a secure passcode;
    transmitting an outbound optical signal from an optical transmitter associated with the optical receiver, wherein the outbound optical signal includes outbound data traffic formatted as plurality of frames;
    determining if the optical receiver is provisioned to receive the inbound data traffic including the secure passcode;
    if the optical receiver is provisioned to receive the inbound data traffic including the secure passcode, reading the inbound data traffic and continuing to transmit the outbound optical signal including the outbound data traffic; and
    if the optical receiver is not provisioned to receive the inbound data traffic including the secure passcode, preventing the inbound data traffic from being read from the optical receiver at least temporarily and provisionally causing the outbound optical signal to include an alternative maintenance signal instead of the outbound data traffic.

8. The method of claim 7 wherein the optical transmitter is configured to include a secure passcode in overhead of at least one of the frames of the outbound data traffic or the alternative maintenance signal.

9. The method of claim 7 wherein the undersea optical communication system is an undersea branched optical network, and wherein the inbound optical signal has been redirected to the optical receiver in response to detecting a fault in at least a portion of the undersea branched optical network.

10. An optical communication system comprising:
    at least a first optical transceiver configured to format first data traffic as a plurality of frames, to include a secure passcode in overhead of at least one of the frames, and to transmit at least a first optical signal including the first data traffic formatted as the plurality of frames from the first optical transceiver;
    at least a second optical transceiver configured to receive the first optical signal and to determine if the second transceiver is provisioned to receive the first data traffic including the secure passcode, and if the second transceiver is provisioned to receive the first data traffic including the secure passcode, to read the first data traffic and to transmit a second optical signal including second data traffic to the first optical transceiver, and if the second transceiver is not provisioned to receive the first data traffic including the secure passcode, to prevent the first data traffic from being read from the second optical transceiver at least temporarily and to provisionally insert an alternative maintenance signal instead of the second data traffic in the second optical signal; and
    an optical path coupling the first and second optical transceivers and configured to carry optical signals transmitted between the optical transceivers.

11. The optical communication system of claim 10 further comprising:
    at least one branching unit coupled to the optical path between the first and second optical transceivers, wherein the branching unit is configured to direct the first optical signal from the first optical transceiver to the second optical transceiver.

12. The optical communication system of claim 11 wherein the branching unit is configured to direct the first optical signal from the first optical transceiver to the second optical transceiver in response to detecting a fault in at least a portion of the optical path.

13. The optical communication system of claim 10 wherein the optical transceivers include trans-oceanic optical transceivers in a point-to-point optical communication system.

14. An apparatus comprising:
    an optical transmitter configured to format outbound data traffic as a plurality of frames, to include a secure passcode in overhead of at least one of the frames, and to transmit at least an optical signal including the outbound data traffic formatted as the plurality of frames; and
    an optical receiver configured to receive an inbound optical signal, the inbound optical signal including inbound data traffic formatted as a plurality of frames, wherein overhead of at least one of the frames includes a secure passcode, and configured to determine if the optical receiver is provisioned to receive the inbound data traffic including the secure passcode, and if the optical receiver is provisioned to receive the inbound data traffic including the secure passcode, to read the inbound data traffic and continue transmitting the outbound optical signal including the outbound data traffic, and if the optical receiver is not provisioned to receive the inbound data traffic including the secure passcode, to prevent the inbound data traffic from being read from the optical receiver at least temporarily and to provisionally insert an alternative maintenance signal into the transmitted optical signal instead of the outbound data traffic.

15. A method of establishing secure communications between optical transceivers in an undersea optical communication system, the method comprising:
    provisioning at least first and second optical transceivers with matching passcodes, wherein each of the first and second optical transceivers is configured to format data traffic as a plurality of frames, to include a secure version of the passcode in overhead of at least one of the frames, and to transmit at least an optical signal including the data traffic formatted as the plurality of frames, and wherein each of the first and second optical transceivers is configured to receive optical signals and to determine if the respective transceiver is provisioned to receive inbound data traffic including a secure passcode in data frames in the received optical signals, and if the respective transceiver is provisioned to receive the inbound data traffic including the secure passcode, to read the inbound data traffic and if the respective transceiver is not provisioned to receive the inbound data traffic including the secure passcode, to prevent the inbound data traffic from being read at least temporarily and to insert an alternative maintenance signal in the optical signal being transmitted; and deploying the first and second optical transceivers in the undersea optical communications system.

16. The method of claim 15 wherein the undersea optical communications system is an undersea branched optical network.

\* \* \* \* \*